UNITED STATES PATENT OFFICE.

LORETTA BARTON WELD, OF FALMOUTH, MASSACHUSETTS.

PREPARING HYDROCHLORATE OF QUINIA.

SPECIFICATION forming part of Letters Patent No. 379,298, dated March 13, 1888.

Application filed January 14, 1887. Serial No. 224,362. (No specimens.)

*To all whom it may concern:*

Be it known that I, LORETTA BARTON WELD, a citizen of the United States, residing at Falmouth, in the county of Barnstable and State of Massachusetts, have invented certain new and useful Improvements in the Manufacture of Hydrochlorate of Quinine, of which the following is a specification.

The manufacture of hydrchlorate of quinine as heretofore practically carried on is attended with difficulties, delays, and expense, which it is the object of my invention to obviate.

In carrying out my invention I take a sufficient quantity of sulphate of quinine and boil it in alcohol with chloride of sodium or common salt. The boiling is continued for ten minutes, and at the end of that time both salts will have been decomposed and converted into hydrochlorate of quinine and sulphate of soda in solution. The solution is then concentrated and cooled, when the sulphate of soda and any excess of chloride of sodium will be precipitated, after which the alcohol is evaporated, when the hydrochlorate will form in crystalline state.

The alcohol used is as free from water as possible, and it is best to use an excess of chloride of sodium.

In actual process of manufacture I use one part of sulphate of quinine to four parts of chloride of sodium and fifty parts (more or less) of alcohol.

By the means described I effectually and completely convert the sulphate into a hydrochlorate, and the crystalline product thus formed is free from anything but a trace of the other salt.

The boiling of the salts is performed either in a strong closed vessel under pressure or in a retort, so that the vaporized alcohol may be collected and conducted to a worm for condensation. The concentration of the solution is effected in like manner if the boiling in the first instance is effected in a closed vessel. By this means the process is conducted with but little loss and is speedily effected, while the various steps are simple operations readily performed without the use of acids, and not requiring the constant and careful and experienced manipulation required in the ordinary process of manufacture.

I have also found from practical tests that the hydrochlorate made as described is more soluble than that resulting from the ordinary process of manufacture.

Without limiting myself to the precise proportions of substances named, I claim—

1. The within-described improvements in the manufacture of the hydrochlorate of quinine, consisting in dissolving the sulphate of quinine in boiling alcohol with chloride of sodium, precipitating the sulphate of soda and any excess of chloride of sodium, and then evaporating the alcohol, forming the hydrochlorate of quinine as crystals, substantially as described.

2. In the manufacture of hydrochlorate of quinine, dissolving sulphate of quinine and chloride of sodium in boiling alcohol, concentrating the solution until sulphate of soda is precipitated, then separating the precipitate and evaporating to deposit the hydrochlorate of quinine in a crystallized form, substantially as described.

In testimony whereof I have signed my name to this specification in the presence of two subscribing witnesses.

LORETTA BARTON WELD.

Witnesses:
R. H. BAKER,
R. A. MCCOY.